US008819185B2

(12) United States Patent
McLaughlin

(10) Patent No.: US 8,819,185 B2
(45) Date of Patent: Aug. 26, 2014

(54) STREAMING INTERNET VIDEO EDITING AND COMPOSITE EDIT PLAYBACK

(76) Inventor: John Charles McLaughlin, Los Angeles, CA (US)

( * ) Notice: Subject to any disclaimer, the term of this patent is extended or adjusted under 35 U.S.C. 154(b) by 417 days.

(21) Appl. No.: 13/204,426

(22) Filed: Aug. 5, 2011

(65) Prior Publication Data
US 2013/0036201 A1 Feb. 7, 2013

(51) Int. Cl.
G06F 15/16 (2006.01)
(52) U.S. Cl.
USPC ............ 709/219; 709/220; 709/221; 709/223
(58) Field of Classification Search
None
See application file for complete search history.

(56) References Cited

U.S. PATENT DOCUMENTS

| 2005/0020359 A1 * | 1/2005 | Ackley et al. ............ 463/31 |
| 2009/0199230 A1 * | 8/2009 | Kumar et al. ............ 725/32 |
| 2009/0327893 A1 * | 12/2009 | Terry et al. ............ 715/719 |
| 2010/0211197 A1 * | 8/2010 | Balentine et al. ............ 700/87 |
| 2011/0274410 A1 * | 11/2011 | Haot et al. ............ 386/250 |

* cited by examiner

Primary Examiner — Djenane Bayard
(74) Attorney, Agent, or Firm — McKenna Long & Aldridge LLP

(57) ABSTRACT

A computer-implemented method for the creation of composite internet videos from streaming video feeds serving as an intermediary between an internet video user and a plurality of separate internet video sources. A user may invoke the service from a web page and fashion a composite video from a plurality of sources without copying or otherwise disturbing the source videos. The user's composite video is defined by an edit decision list (EDL) which specifies the location of the plurality of separate videos, the "cut in" and "cut out" locations within the separate videos where the composite video will transition between the separate videos, and an audio volume value associated with each video.

16 Claims, 5 Drawing Sheets

STREAMING INTERNET VIDEO EDITING AND COMPOSITE EDIT PLAYBACK

BACKGROUND OF THE INVENTION

1. Field

The present invention relates to the editing and sharing of time sequenced multi-media materials (audio/video in particular) from internet sources.

2. Description of the Related Art

Certain mechanisms for editing of video materials have been long established. The overall goal of video editing is to present the viewer with sequential excerpts from separate video sources as single composite video image. Therefore an essential skill of a video editor's craft is the selection of edit points from their source material. The audience experience of a switch from one audio/video source to another is by its nature visually disruptive. This disruption can be minimized by the careful selection of edit points. For example, a cut in a basketball game video would likely be least disruptive if it occurred between the time the ball passes through the net of a scoring basket and the time when the opposing team retrieves the ball for the next play. The window of time for this cut could be as little as 0.3 seconds. Another example could be an excerpt from a speech. A cut in such a speech would likely be least disruptive if it happened at the end of an applause moment in the speech but before the speaker resumed speaking. This instance may have a larger window for an acceptable edit—perhaps 2 seconds. But cutting at a cough or other short pause in the speech would require a much shorter window. Thus providing the editor with a tool that can work within a short window of editing opportunity can provide them with greater editing options. Conventional desktop non-linear editing tools provide frame accurate editing capability—with editing windows of less than 0.04 seconds. However there are no known tools for providing such accuracy for multiple streaming audio/visual sources.

In the early days of video editing, physical cutting of video source media was required. In later years, video switching technology was developed that employed synchronization between the outgoing and incoming media sources to allow for an electronic switch between the sources to occur at a virtual cut point. This allowed for the recording of a third video which included this transition. This process, which is repeated to create a single video with multiple cuts, is called "linear editing". For example, U.S. Pat. No. 4,538,188, issued Aug. 27, 1985 is a video composition method and apparatus for dynamically composing sequences of visual source material or edited output. However the introduction of high speed digital computers has substantially replaced such "linear editing" techniques with "non-linear editing" methods. Non-linear editing allows for the presentation of randomly accessed individual frames of video from an arbitrary number of sources. For example, U.S. Pat. No. 6,489,969, issued Dec. 3, 2002 is a media composition system with media consolidation employing digital techniques to receive, digitize, store, and edit video and source material. One major benefit of non-linear editing is that the source material does not need to be physically copied to present the viewer with the resulting composite video. This gives the editor a great deal of interactivity and reduces storage requirements for test composite videos. Nearly all modern video editing utilizes non-linear editing tools, but such tools generally require frame accurate control of locally stored source material. Furthermore the ultimate objective of most non-linear editing systems is to create a single linear composite video (often called the "final edit master") which is stored, copied, and distributed independent of the original source material and the list of edits that created it. This makes it difficult, if not impossible, for viewers to see the original context of the edits, or for other editors to create alternative composites.

The power and precise control of non-linear editing systems also bring added user interface complexity, most such systems provide an visual abstraction of the video as a sequence of image frames, which allow the user to pick a precise frame on which to make the edit. Some editing systems also abstract the audio as waveforms, and abstract various transitions as user editable graphs. Casual users of editing systems are often bewildered by these abstractions, so there is a constant need to simplify editing systems to reduce barriers to entry. Furthermore, user expectations of browser based applications are especially sensitive to user interface complexity.

Streaming of internet video has also been long established. The fundamental idea is that video data is downloaded from a server to a viewer's client computer to non-persistent storage. While downloading, the client computer can start playing the video asynchronously. This is possible because the client computer buffers a small amount of video ahead of the currently playing video. This buffer is typically large enough to accommodate fluctuations in download rate. Ideally the rate of download of the video should be larger than the rate of video consumption by the viewer. Otherwise the video playback will need to be stalled to accommodate sufficient buffering (a.k.a., buffering fault). Furthermore, to reduce download bandwidth requirements, and hence buffering faults, the video data is usually highly compressed. Compression techniques can take advantage of temporal (interframe) coherence of data. That is to say, significant compression can occur when sequential frames of video comprise identical or similar information (i.e., sequential frames don't differ by much). Many compression techniques take full advantage of this characteristic. An unfortunate side effect for video editing, is that individual video frames are no longer randomly accessible. In fact, the notion of individual video frames may not be meaningful, and is not even included in the browser standards specifications (e.g., http://www.w3.org/TR/html5/video.html#media-elements). Therefore frame accurate "non-linear" editing of such streaming internet video is challenging, if not impossible.

Alternatively, there are tools for downloading of compressed video, and transcoding the video into formats that are digestible by editing systems. However the use of such tools often violates terms of service agreements and/or copyrights of the source video provider. Furthermore, the resulting composite video may suffer from generation loss associated with multiple compressions, decompressions, and transcodings.

A related strategy for editing of internet based video, performs the edit composition on a server and transmits the resulting video stream to a client browser. See e.g., U.S. Patent Application Publication No. 2002/0116716, filed Feb. 22, 2001, and U.S. Patent Application Publication No. 2010/0260468, filed Apr. 6, 2010. However this strategy requires significant server side computational resources to download and process source videos, and then transmit the composite video. Additionally, since the final video is computed in real time, this strategy neutralizes the benefits of internet "edge caching" for static video assets. Edge caching is a load balancing and performance management technique that utilizes dedicated server resources on a network. These servers, based on their awareness of network protocols, essentially siphon off the network traffic of one application from the others and process that data specially to improve the performance end users of a target application can receive.

In contrast to the above related art, the objective of the present invention is to provide a system that can present internet users composite videos directly from original streaming internet source videos.

In addition to allowing the playing of video, most internet video sources, also provide programmable control of their video through a client browser Application Programming Interface (API). Typically, these are exposed through JavaScript bindings. One example is the YouTube Player API (http://code.google.com/apis/youtube/js_api_reference-.html). Another example is the HTML5 MediaElement (http://www.w3.org/TR/html5/video.html#media-elements). Such APIs allow 3rd parties to embed videos within their own sites, and control operation and properties of the embedded video within their sites. While these APIs are most often exposed as bindings which extend the JavaScript language, they may also be exposed in another language such as Adobe ActionScript or Java. Although such APIs are not necessarily designed for video editing, they often have the minimal functionality required for this application. For the purposes of video editing these minimal requirements are the abilities to start and stop a video, the ability to query the start/stop state, the ability to query the current video time, the ability to seek the video to a specified time, and the ability to control the volume of the corresponding audio stream. In practice these functions all vary in both precision and accuracy. For example, the time required to start a video playing from the time an API command is issued could be 0.5 seconds or more depending on how much video is buffered, and what other processes are competing for the client computer's resources. Such API functions have been used in limited circumstances to control video editing of internet sources. One example is the Kaltura Video Sequencer (http://www.kaltura.org/html5-video-sequencer). Additionally, such API functions have been used to control the excerpting of videos. For example, see (http://www.splicd.com/). This site uses the YouTube API to allow the user to only show a defined excerpt of a single video.

It is common practice for internet applications to collect information with regard to user interaction. For example, various Google and Facebook applications take advantage of a transparent feedback loop to improve their user's experience. An additional object of this invention is to include such a feedback loop in the monitoring of the invention's edit transitions, to aid in fine tuning its capabilities.

Most internet video sources and some 3rd party internet sites also allow their users to define "playlists". Such playlists are typically sequences of contiguous videos either from their own site or from a variety of internet sources. Players for playlists vary in their video selection and editing capabilities. Some only allow for simple sequencing of complete video clips (You Tube playlist player), while others allow for setting of in and out points (Kaltura Video Sequencer). However known video playlist players do not attempt to synchronize the edit points of source videos with split second accuracy.

Internet video providers and playlist sites typically allow for a variety of sharing options. These usually involve sharing an internet link of a video through email or a social media function, or they involve the embedding of the shared video in a social media, blog, or other web site. Such sharing is extremely popular and practical, since it doesn't require the copying of large video files—only the transfer of an internet link to the video files.

Standards compliant internet browsers also provide web site authors API control over the hiding and showing of various web site display elements. This facility is used in a variety of applications. For example, most web sites that incorporate a photo slide show component use this functionality. As will be seen below, this ability to hide and show display elements is important for this invention.

SUMMARY OF THE INVENTION

According to an embodiment of the invention, there is provided a computer-implemented method of providing internet users with composite videos directly from original streaming internet source videos, by specifying in a edit decision list (EDL) with a computer-implemented service. The EDL comprises a plurality of video source locations, an in and an out point for each video source, and an audio value for each video source. In one embodiment, the service comprises a server computer that operates in a first network domain that is separate from a network domain of the plurality of video sources. The method establishes connections to each of the plurality of video sources, and sends, from the server, instructions to a user computing device to create a plurality of playback windows in a standards compliant browser, one playback window for each video source. The server then responds to a user request to play composite video by controlling the plurality of playback windows as specified in the EDL.

In another embodiment of the invention, there is provided a method for accurately transitioning among a plurality of streaming internet videos from one or more sources in a standards compliant browser comprising storing, at a server computer, a plurality of edit decision lists (EDL). The method then accepts a request to specify a particular one of the plurality of EDLs. The server computer provides, to the browser on an internet connected computer the particular EDL and instructions to frame at least one video playback window and an associated user interface. The server computer then establishes connections to the one or more sources of the streaming internet videos as specified by the particular EDL, and controls the associated user interface based on the particular EDL to facilitate download of a first video from a first source to a first video playback window visible to a user in the browser, facilitate download of a second video from a second source to a second video playback window hidden behind the first video playback window, determine an out point of the first video from the particular EDL, determine an in point of the second video from the particular EDL, pause the second video in the second video playback window a predetermined time before the in point of the second video, hide the first video playback window and show the second playback window in front of the first video playback window when the first video reaches the out point of the first video, and unpause the second video in the second video playback window.

In still another embodiment of the invention, the server computer establishes connections to the one or more sources of the streaming internet videos as specified by a particular EDL, and controls a user interface based on the particular EDL to facilitate download of a first video from a first source to a first video playback window visible to a user in the browser, facilitate download of a second video from a second source to a second video playback window hidden behind the first video playback window, determine an out point of the first video from the particular EDL, determine an in point of the second video from the particular EDL, synchronize the second video in the second video playback window with the first video the first video playback window such that the second video is playing at the in point of the second video when the first video reaches the out point of the first video, and display the second playback window in front of the first video playback window when the first and second videos reach the now synchronized out point/in point.

BRIEF DESCRIPTION OF THE DRAWINGS

Embodiments of the invention will now be described, by way of example only, with reference to the accompanying drawings in which.

DETAILED DESCRIPTION

Figure 1:
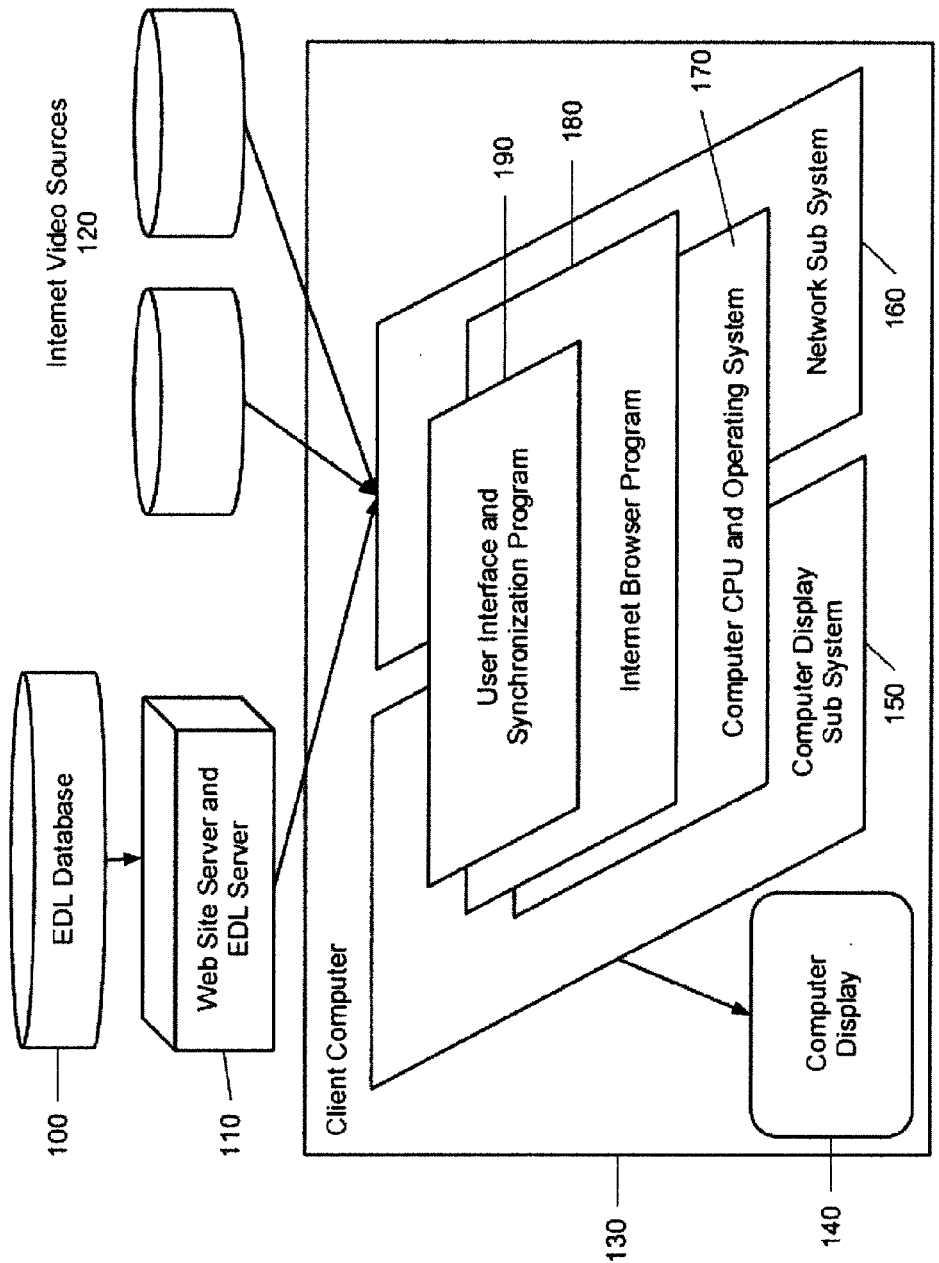
FIG. 1 depicts an internet connected computer network environment.

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention has four primary functions:
1. Provide a mechanism to accurately transition among streaming internet video sources in a standards compliant browser.
2. Provide monitoring of the above transitions in client browsers and upload of this information to the originating server to establish usage and reliability patterns.
3. Provide a browser based mechanism to define and review the edit decision list (EDL) for multiple such video transitions.
4. Provide a mechanism to store the EDL on an internet based server, associate the EDL with a user account, and provide for the ability to share the audio/video playback defined in function (1) with other internet users.

Each of these four primary functions are further detailed below.
1. Provide a mechanism for accurately transitioning between streaming internet video sources in a standards compliant browser.

The basic idea is closely related to early video tape switch based editing.
1. The first video (called the A roll) is already assumed to be playing in the browser.
2. When the A roll is some number of seconds S before its transition out time, the second video (B roll) is started. The B roll is triggered to start some number of seconds S before its targeted transition in time, with S<P. B starts playing in a hidden window, with its audio component muted.
3. After B has confirmed to have started, it current time is measured against where it needs to be at the transition time. Ideally B will still be running ahead of A.
4. B is paused for certain estimated time periods and quickly restarted, to get it into close synchronization with A.
5. If B gets significantly behind A in synchronization, the program will attempt to force B to seek ahead so that B gets back ahead of A.
6. At the synchronization out time for A, B's window is switched in front of A.
7. B's audio is quickly faded on while A's is quickly faded off.
8. A's video is stopped and its buffer is released, while B continues playing until the next transition.

2. Provide monitoring of playback in client browsers for any given EDL and provide for the upload of this information to the originating server to establish usage and reliability patterns.

The accurate performance of the composite video playback is crucial to the user's favorable experience with an embodiment of this invention. Therefore this invention includes the ability to monitor the playback accuracy of the edits in a composite video. These performance statistics along with available browser and operating system information may be uploaded to a server. These statistics can be used to identify usage and reliability patterns, and these patterns can be used to modify parameters of the playback system, or assist in other diagnostic tasks.

3. Provide a browser based mechanism for defining and reviewing the edit decision list (EDL) for multiple such video transitions.

This invention simplifies and optimizes the user workflow of video editing around three basic operations: Selection of the video from internet sources, setting the in and out points of the video, and reviewing and testing the resulting edits.

4. Provide a mechanism to store the EDL on an internet based server, associate the EDL with a user account, and provide for the ability to share the audio/video playback defined in function (1) with other internet users.

At the user's request the EDL is uploaded to a database on an internet accessible server computer. This storage of the EDL on an internet accessible server allows for the encapsulation of both the playback and editing functionality of the EDL into an HTML frame that can be embedded in 3rd party web sites. This frame can be specified and accessed with a single internet link (URL). Similarly the playback and editing encapsulation can be shared through email or other internet based tool via the communication of a single URL. Each EDL stored on the server also includes parent and child relationship information, so that the modification and derivation history of each EDL can also be shared.

Example Use Cases

"Best of" Compilations from Diverse Sources

For example, an internet based blog writer may want to include a composite of the funniest clips of cat videos from internet sources. Rather than presenting these videos within separate embedded browser windows, they would likely prefer to string together excerpts in a single video playback window.

Excerpts from Copyright Protected Sources

For example, an internet sports reporter may want to display compiled hightlights from a basketball game video that has been posted on the internet. This invention: (a) does not copy the original source material, (b) allows for links to the original source material, and (c) allows the original source creator to retain control of the source material's display. Therefore, it may provide sufficient protection of the source creator's rights while still allowing for the reporter to provide effective reporting to their audience.

Near Context Editing

For example, suppose a political reporter would like to provide their viewers with important moments from a candidate's speeches. This invention could reduce the credibility risks of "out-of-context" editing, because the original source material is untouched and immediately accessible.

Embodiment Framework

The environment of the present invention is that of a conventional internet connected computer 130, as diagrammed in FIG. 1. The client computer 130 further comprises a Central Processing Unit (CPU) and Operating System (OS) 170, a network sub system 160, a display 140, and a display sub system 150. The browser user interface 180 allows the user to specify an internet link via a Uniform Resource Locator (URL) that represents a previously constructed Edit Decision List (EDL) from the EDL database 100. The result of this request is a download of the EDL, a program for manipulating the EDL, and the web site markup instructions (HTML) that are used to frame the video playback window and its associated user interface 190. In the preferred embodiment, the program is written in the JavaScript language. As is conventional, the website is constructed and the downloaded program is installed within the browser environment 180. Also through conventional means, the program in turn requests the establishment of connections to the sources of the streaming video 120 as specified in the EDL, and after the connections are established user interface controls are made available to through the client browser 180.

In the preferred embodiment, the EDL is simple and conventional. Each list entry contains an identifier for the video source (pointing to a network location where the video is located; in each video source may be located at a different network location), "in" and "out" points for the entry, and an audio volume value for the entry. When the user "clicks" the "Play" button, the videos are played in sequential order from the list, starting each at its "in" point and ending each at it's "out" point.

The user interface has two distinct modes of interaction "editor" and "viewer" which correspond to the two distinct user roles. The "editor" is the active role that creates the composite video, and the "viewer" is the passive role that is the audience for the composite video.

In the preferred embodiment, the "editor" mode has conventional tools for searching, selecting, and adding video clips to a playlist. If available, "thumbnail" still images are used to visually represent the video clips in the playlist. Selecting one of the video clips from the "playlist" displays that clip in a playback window of the browser and exposes controls for setting the "in" and "out" edit points for that video. After the edit points are selected for each video clip, the editor can review their work in the playback window and adjust the edit points as needed. When the editor is satisfied with the composite video, the resulting EDL can be uploaded to the editor's user account in the EDL database 100.

The EDL server 110 provides the bridge between the "editor" and "viewer" roles. The EDL server has the ability to generate internet links that the "editor" can transmit to potential "viewers". For example, this transmission can be accomplished by email or by an embedding of a "viewer" link on an existing web site.

The "viewer" user interface provides the usual controls that a user would expect for a playback of a single video. This includes the ability to stop and restart the video sequence, as defined by the EDL, at any given point in the sequence. It also includes the ability to seek the video to any user defined point in the sequence.

Much of the "editor/viewer" roles and their associated workflow is conventional technology. The most notable exception for the purposes of this invention is the playback functionality for the composite streaming video.

Playback Options for Composite Streaming Video

Figure 2A:
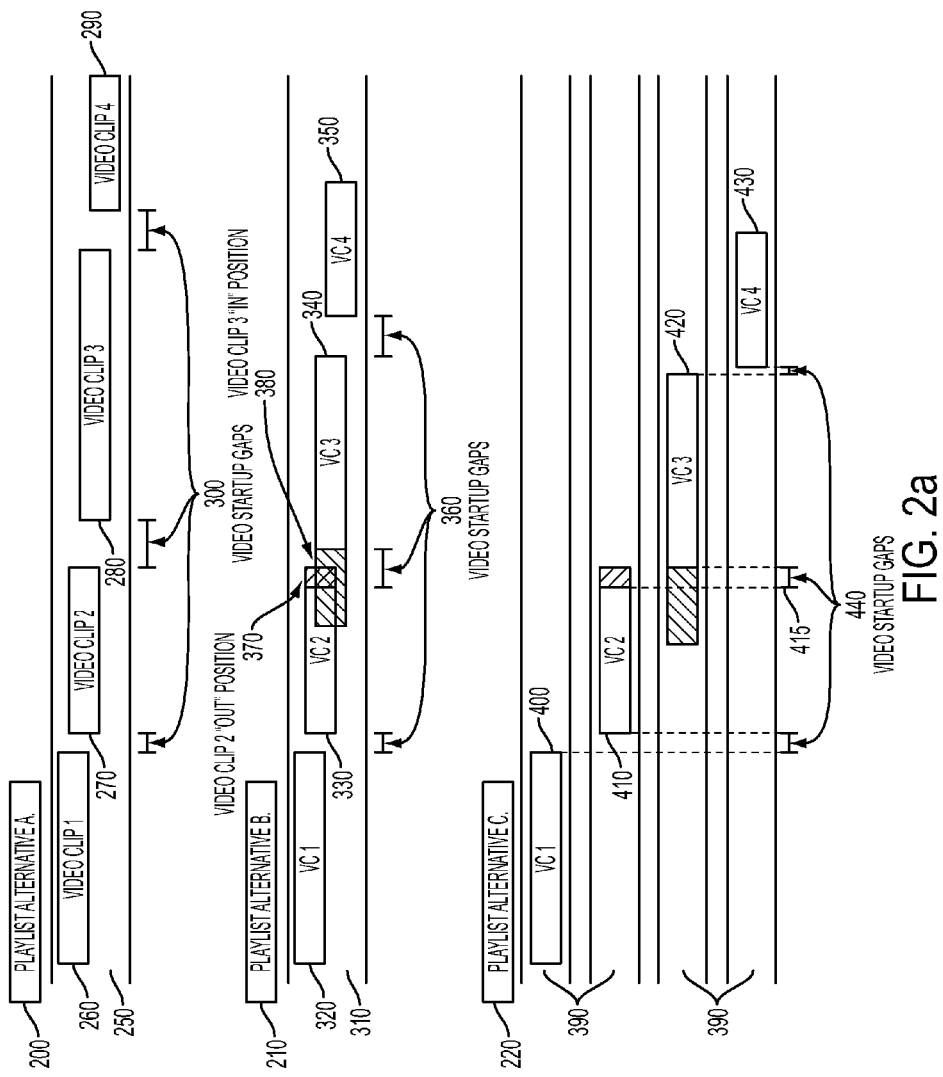
FIGS. 2a and 2b illustrate the different scenarios encountered using various playlist alternative implementations.

As mentioned in the previously, providing an editor the ability to establish accurate edit points can provide them with better editing choices, and ultimately a better end user viewing experience. This section, along with the corresponding diagrams of FIG. 2a and FIG. 2b, detail alternative embodiments which illustrate the problems and solutions which are ultimately addressed by the preferred embodiment.

As a practical example, consider a online sports blog publisher who would like to present his viewing audience with a single basketball highlights composite video from four existing internet based video clips. For the sake of simplicity, we will assume that he will be using "Video Clip 1" (VC1) and "Video Clip 4" (VC4) in their entirety, but would like to specify an "out" point on "Video Clip 2" (VC2) before its end, and an "in" point on "Video Clip 3" (VC3) after its beginning. Suppose that this blog is focusing on one particular athlete, and that his preferred "out" point on VC2 occurs just after the player scores and the ball goes through the net, and the preferred "in" point for VC2 occurs just after the player receives an inbound pass. For both the "in" and "out" points, the timing window for the cut is about 0.1 seconds.

Playlist Alternative A (200). Using existing playlist tools (e.g., http://embedr.com), it is possible to string together multiple video clips to play back sequentially in a single browser playback window using one instance of the browser's video player. This embodiment is illustrated 250 by "Playlist Alternative A" 200. In this situation, VC1 260 will play in its entirety, and when it is done, VC2 270 is loaded into the browser's video player, and it is played in its entirety, and similarly followed by VC3 280 and VC4 290. All that is required of the video player API for this embodiment is the ability to programmatically load, unload, and start the videos. This embodiment would typically hide the loading video behind a still image proxy image from the incoming video. However, this embodiment does not meet the requirements of our blog publisher. In particular, it does not allow setting of the "in" and "out" points of videos, and there is a significant delay incurred when one video transitions to the next as illustrated by the "Video Startup Gaps" 300. This delay primarily results from the establishment of the connection to the incoming video source, and the initial buffering of the incoming video. The duration of these delays are not readily predictable and can typically last several seconds.

Playlist Alternative B (210) illustrates an improved embodiment that allows for the setting of "out" 370 and "in" 380 points on VC2 330 and VC3 340, respectively. This scenario takes advantage of additional API functionality to "seek" to a specified playback time location of VC3 340. Nevertheless, this embodiment does not satisfy the requirements of our imagined blog publisher in that it suffers unacceptably large "Video Startup Gaps" 360, and still frames are displayed in those gaps.

Playlist Alternative C (220) improves on the above by separating each video clip into its own video player instance 390 within the browser. The use of multiple video player instances is very common on internet news web sites, which often display multiple separate video windows to their audience. In contrast, one embodiment of the present invention stacks the video windows on top of one another, and only displays one at a time to the viewer. This ability is enabled by standard positioning functionality of Cascading Style Sheets (CSS) applied to the video player's HTML container elements. Thus, the viewer has the impression that they are looking at a single video window. The Kaltura Video Sequence is an example of this alternative embodiment. The use of separate player instances can result in several benefits:

1. Internet connections to the video clip sources can be established early—when the initial page is displayed rather than when the when the video is required to play.

2. The video stream can also start buffering when the initial page is displayed rather than when it is required to play.
3. In situations where the "out" time 415 of a video is less than its end time (such as VC2 410), the composite player can continue playing the streaming video of VC2 410 rather than displaying a still image during the video startup gap.
4. Separate player instances expose independent controls for each instance, and operate the videos within separate asynchronous processing threads.

Benefits number one and number two eliminate the largest part of the video startup gaps 300, 360 in the previously described embodiments (i.e., Playlist Alternative A and B)—those associated with the internet connection. What remains for the gaps 440 are localized to the client computer. These may include: loading software and data into memory, context switching, uncompressing the buffered video, processing of prior queued events, and inaccuracies in the "seek" operation. The resulting video startup gaps will typically be reduced to between 0.3 seconds and 1 second. Nevertheless benefit number 2 comes with a significant cost. The player APIs generally expose only limited control over buffering. For example, Flash videos don't allow for the API to set a buffering end point. So generally the pre-buffering of videos is an "all or nothing" proposition. Choosing "all" when the composite video is only using short clips from several long videos can severely impact the computer's performance, because all of these pre-buffered videos will contend for bandwidth, CPU, and memory, as they are concurrently downloaded. The preferred embodiment is not dependent on pre-buffered video as described in this embodiment, but instead uses the more selective buffering described below in "Playlist Alternative E".

Benefit number three is significant however, because a transition from moving video to another moving video is much less visually jarring than a transition interrupted by a still image—even if the apparent cut is not exactly where the editor intended. For our target blog publisher, this accuracy may be sufficient for some transitions, but typically it won't be in their target range of 0.1 seconds.

Benefit number four is only minimally important for "Playlist Alternative C". But it is an essential ingredient for the embodiments of Playlist Alternative D and E as well as the preferred embodiment.

Playlist Alternative D (230) is a slight modification of Playlist Alternative C 220. It assumes that there is minimal expected video startup gap "h" for any video clip 470/480/ 490, and uses this as a "headstart" value 520 for each incoming video. More specifically, this embodiment would trigger 500 the start of the incoming video 470 "h" seconds before the "out" point 465 of the outgoing video. This alternative embodiment removes a fixed predictable component 520 of the "video startup gap", and all that remains is an unpredictable component 530. In other words, our blog publisher will find that his actual observed cut points will sometimes lie within his target range. Note that this improvement is not possible without independent player controls.

Playlist Alternative E (240) takes advantage of a common player characteristic for compressed video—a video stream that has been loaded and paused can be restarted more quickly and accurately than a video stream that plays from its "zero" start point or any given "seek" point. There are several reasons for this, but in slightly over-simplified terms the "pause" API operation can leave the video memory in a loaded uncompressed state at a specific frame, while a video in a "stopped" state may have released its video memory, and will need to reload and uncompress it from scratch. As a more concrete example—with H.264/MPEG-4 interframe encoding—a "seek" operation may land the video at an incomplete P-frame or P-slice, and the seek may need to back up to a complete I-frame. Such I-frames may be up to 0.5 seconds away from the requested seek point.

In this alternative embodiment 240 the strategy for queuing a incoming video such as VC3 570 is to "seek" to a convenient point 572 before the "in" point 574, start the video playing, and pause it at the "in" point 576. This can all be done while the incoming video VC3 570 is hidden from the user behind the outgoing video VC2 560. In the special case where the "in" point is the zero point of the incoming video (e.g., VC4 580), the seek operation does nothing and the play operation is paused as soon as soon as the API can detect viable video 582—typically this will happen with "buffering" event followed by a "play" event. When the outgoing video reaches its "out" point 578, the incoming video 570 is unpaused and swapped in front of the outgoing video 560.

A side benefit that this embodiment shares with the preferred embodiment is that the video APIs typically will continue their download buffering even while a video is paused. The result is that (usually) at most two videos are actively buffering at the same time—the outgoing video clip and the incoming clip. Therefore, most of the buffering contention from "Playlist Alternative C 220" can be avoided.

Since the time required to restart a paused video could be typically 0.01 to 0.1 seconds, this alternative 240 could ideally fulfill the requirements of our blog publisher. However, there are some practical issues that prevent this alternative from achieving the ideal.

1. In practice the "current playback position" of a video may not be accurately reported through the player API. Variances of more than 0.1 seconds have been observed. Therefore, computation of relative timings between an incoming and outgoing video may be inaccurate.
2. Browsers generally don't provide a direct method to trigger an action when a video hits a specific time. Therefore the timing for this action must be estimated and scheduled. In JavaScript this is normally done through the "setInterval" function. However this browser scheduled timing action to "unpause" the incoming video may be delayed. There are two sources of delay—delays in the browser scheduling due to CPU and other computer resource contention, and delays associated with event processing of prior events in the browser's event queue. Managing multiple streaming videos can result in significant delays of both types.
3. As shown in the FIG. 2b, the outgoing video 560 may experience a "buffering fault" 600 (in spite of the improved buffering strategy). This occurs when insufficient data has been downloaded from the video server for the video to continue playing. During a buffering fault, the player is paused until sufficient data has been received.

Note that the previous alternative embodiments 200/210/ 220/230 are not immune to these problems, "Playlist Alternative E" 240 is just particularly sensitive to them, because the more serious deficiencies of the other alternatives have been minimized.

For examples of each problem, examine each of the transitions of the associated diagram. For the VC1 550 to VC2 560 transition, after VC2 performs its seek/play/pause step 562 this embodiment will schedule a "play" API operation to unpause VC2. This play operation will be scheduled to occur at the expected "out" time of VC 1 564. However, browser scheduling delays result in a small VC1 to VC2 startup gap 566. In practice, such delays have been observed in the 0 to 0.3 seconds range. For the purposes of the preferred embodiment, it is important to note that scheduling delays are minimized when the interval between the current time and the scheduled start time is short.

Figure 2B:
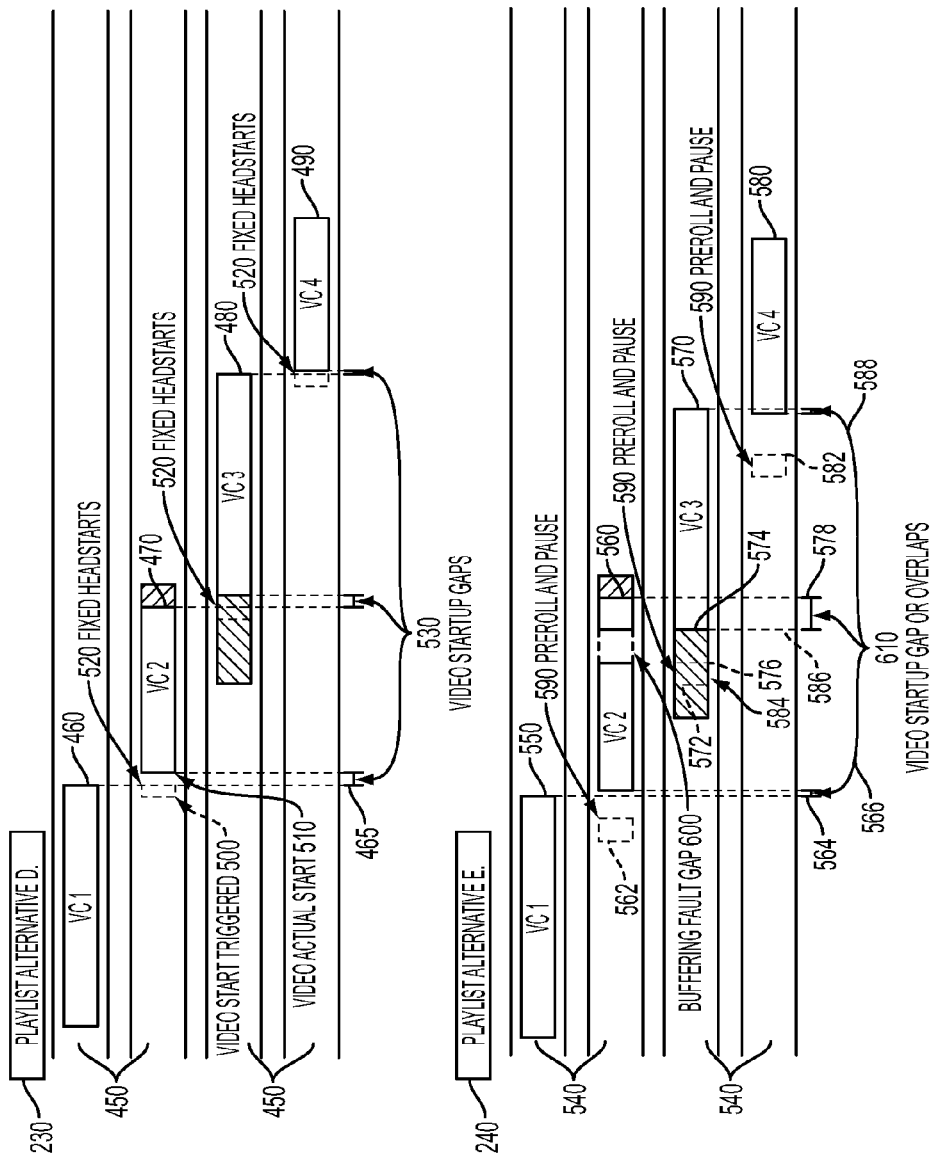

In the situation of the VC2 560 to VC3 570 transition of FIG. 2*b*—after VC3 570 goes through its seek/play/pause step 584—VC3 570 is scheduled to start at a time which corresponds to the expected "out" point 586 of VC2. As shown, a buffering fault 600 in VC2 creates a gap in the VC2's playback, and therefore VC3 will start 574 before VC2 reaches it's "out" point. For our blog publisher this overlap is actually a worse problem than a gap because it means that the some part of the desired action—either from VC2 or VC3 will not be visible to the viewer. Of course this embodiment could be enhanced to procedurally reschedule the VC3's start after a "buffering" event is detected from VC2. However, this situation is handled more reliably by the preferred embodiment.

The VC3 570 to VC4 580 transition illustrates a result of the inaccuracies in the relative "current playback time" for VC3 and VC4. This can result in a small gap or overlap 588.

Synchronization

This section described the preferred embodiment of the present invention and can be understood in the same context as the above alternative embodiments—to provide accurate cut transitions among multiple streaming videos. As can be seen with the above, it is important for this embodiment to be tolerant of buffering faults, inaccurate timing events, and inaccurate "current playback time" reporting. To explain this embodiment in detail, this section focuses on a single transition.

The system for this synchronization as described by the preferred embodiment can be assumed to apply to all applications which involve the synchronization of two or more time based media elements, using functions provided by a standards compliant internet browser or an Application Programming Interface (API) with similar functionality. The functions required from the browser/API for a given media stream are:

1. QueryCurrentTime—This returns time associated with the currently displayed media element as measured in seconds from the beginning of the media element.
2. QueryPlayState—Return either "stopped" or "playing" based on current play state of the media.
3. Stop—Stop playing the media and freeze it at the current time.
4. Start—Start playing the media element from the current time.
5. Seek(time)—Change the media's current time to "time".

In the preferred embodiment, these elements are compressed video streams from internet sources, and these streams include their own synchronized audio component. However, these elements could be any media element from any source that are controllable through the above mentioned API functions. These include pure audio or video components, 3D animation components, or even still images. Additionally, the aim of this synchronization in the preferred embodiment is to provide an accurate trigger time to switch display of one video stream to another. However, the result of this synchronization could also include the triggering of any transition of media elements, including dissolves, wipes, fades, etc.

The preferred embodiment assumes that the above functions have varying degrees of accuracy. In particular the following parameters are defined to describe the expected behavior of these functions.

1. SEEK_START_DELAY (1000 msec)—the average expected amount of time a video takes to start playing when the Play is preceded by a Seek operation.
2. PAUSE_START_DELAY (30 msec)—the average expected amount of time a video takes to start playing when the Play is preceded by a Stop operation.
3. CURRENT_TIME_ACCURACY (100 msec)—the average expected difference between the actual visual content's time and the time returned by QueryCurrentTime.
4. SEEK_ACCURACY (1500 msec)—the maximum difference between the requested Seek time and the resulting time as returned by QueryCurrentTime.

The actual values of these parameters depend on many factors that are not controllable and in most cases not a priori knowable by the synchronizing program. However, they can be approximated through empirical measurement. Approximate values determined for one embodiment are shown in parentheses above. Note that the SEEK_START_DELAY and the SEEK_ACCURACY are large values compared to the PAUSE_START_DELAY. This points to the overall strategy of the synchronization system. Seek operations are used for large time adjustments, while Stop-Start combinations are used for fine adjustments. For the purposes of this embodiment we'll also assume that, (PAUSE_START_DELAY<CURRENT_TIME_ACCURACY).

Figure 3A:
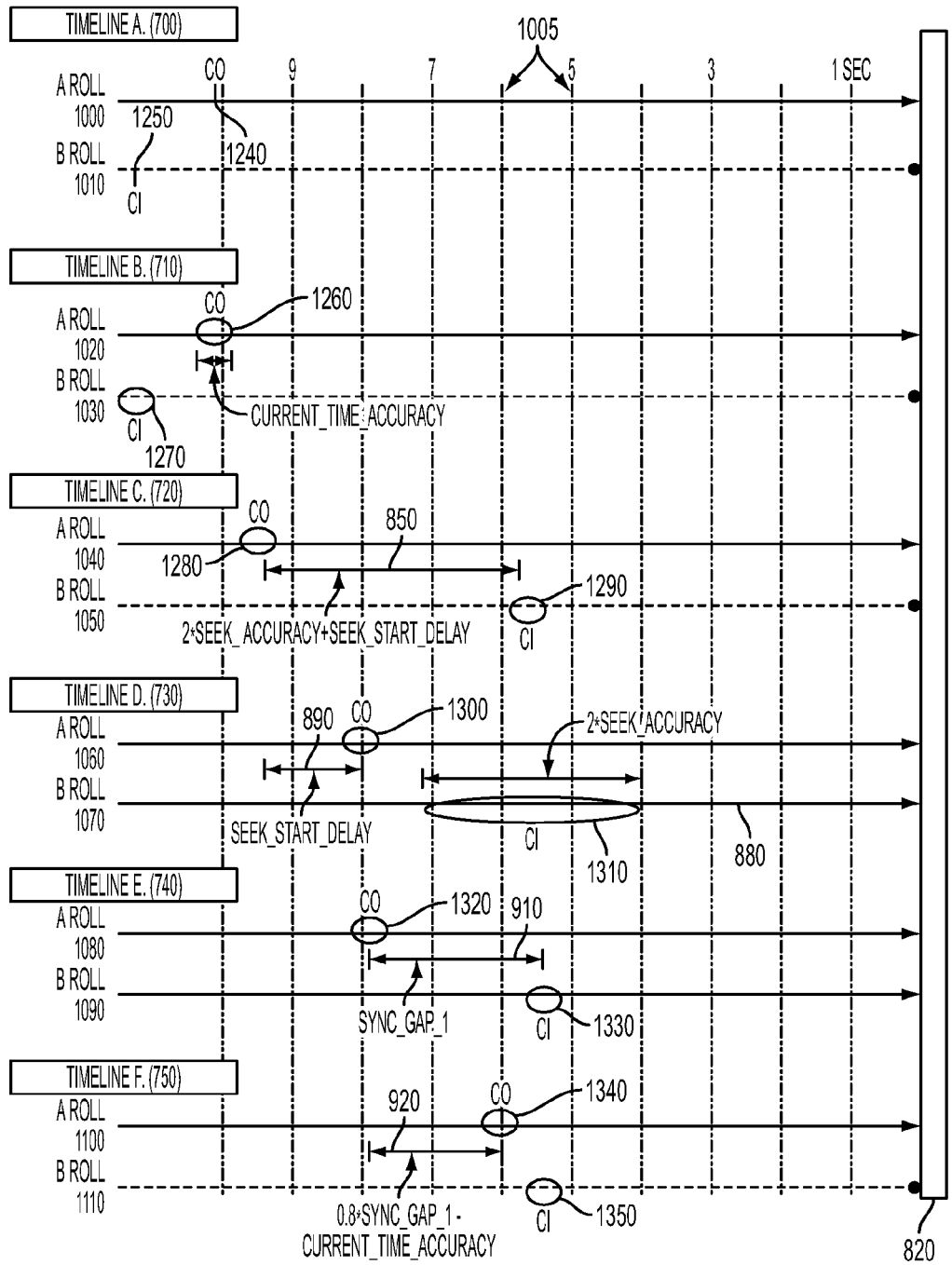
FIGS. 3a and 3b illustrate the details of a synchronization system.
Figure 3B:
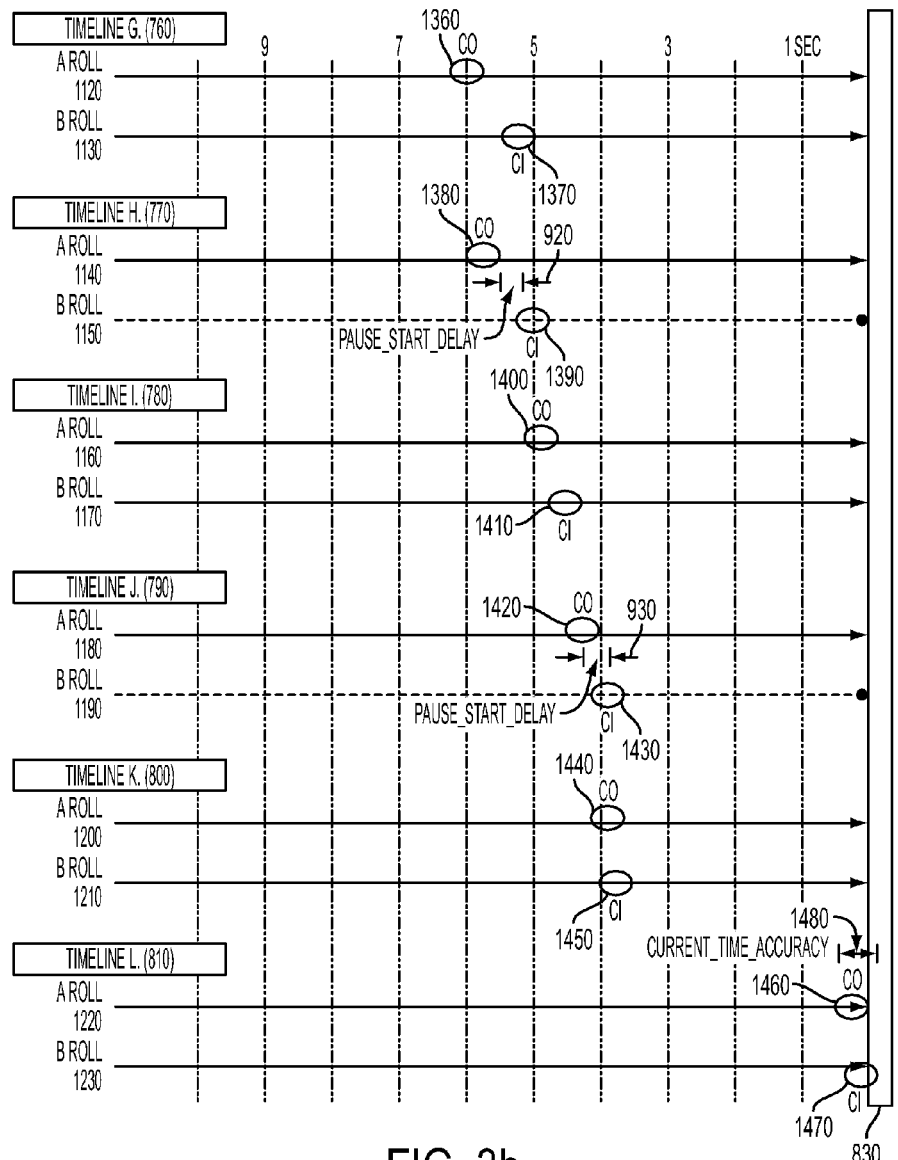

The details of the synchronization system are illustrated in diagrams FIG. 3*a* and FIG. 3*b*. The "Timelines" expressed in these diagrams represent the position in time of two videos: "A Roll" 1000 represents a video that is already playing. The point "CO" 1240 on the A Roll timeline represents the target "cut out" time of the video. Similarly the "B Roll" 1010 represents the next video in the sequence after A Roll. The point "CI" 1250 on the B Roll represents the target "cut in" point of the video. The intersection of the right side vertical bar 820 in FIGS. 3*a* and 830 in FIG. 3*b* with the timelines represents the value of the "QueryCurrentTime" function applied to corresponding video. The points in time designated by vertical dotted lines 1005 represent relative time from the QueryCurrentTime values. Thus for example in "Timeline A" 700, the QueryCurrentTime value is approximately 10 seconds less than the CO value 1240. Which means that A Roll 1000 has approximately 10 more seconds to play before it cuts to the B Roll 1010. As A Roll 1000 continues to play, QueryCurrentTime will increase in value. As this occurs the relative difference between QueryCurrentTime and the CO value 1240 will shrink, so in successive timelines the CO mark will move to the right. Finally, when the CO mark meets the QueryCurrentTime value (e.g., Timeline L 810) it will signal that it is time to "cut" to the B Roll. The object of the synchronization process is that the CO mark of A Roll 1460 and the CI mark of B Roll 1470 arrive at the vertical bar 830 at approximately the same time. Also notice the timeline for the B Roll is represented by a dashed line in several timelines (e.g., 1010/1030/1050/1110/1150/1190). This represents a "Stopped" state for B Roll, while the solid timelines (e.g., 1070/1090/1130/1170/1210/1230) represent "Playing" states for B Roll. All of the timelines represent snapshots of the transition before the cut from A Roll to B Roll, therefore A Roll is visible to the user and in a "Playing"—solid line— state for all the timelines (e.g., 1000).

"Timeline B" 710 is the same as "Timeline A" 700 except the time markers 1240/1250 for CO and CI are replaced by ovals 1260/1270. These ovals represent inaccuracies in the value reported by QueryCurrentTime. As defined above, the width of these ovals is thus CURRENT_TIME_ACCURACY.

When the difference between CO and A Roll's QueryCurrentTime becomes sufficiently small, the synchronization process can start. This difference in the preferred embodiment is approximately 10 seconds. The first step in this process, as represented by "Timeline C" 720, is a Seek operation 850 on B Roll 1030. Since the Seek operation is inaccurate and incurs significant restart overhead, it is targeted to move CI 1290 well ahead of CO 1280. While "Timeline C" 720 represents the target of the Seek, "Timeline D" 730 represents the situation when the B Roll 1070 actually starts playing (as indicated by the solid timeline 880). In the time it takes for B Roll 1070 to start, the A Roll 1060 has played an additional SEEK_START_DELAY seconds 890. Furthermore, the uncertainty about where the actual Seek operation landed is represented by the stretched oval 1310 in Timeline D 730.

After B Roll 1090 has been confirmed to be in a "playing" state, the relative position of CI is measured by using B Roll's QueryCurrentTime operation. Then the relative position of CI 1320 vs CO 1330 can be determined to within approximately

2*CURRENT_TIME_ACCURACY.

This new measured difference is labeled "sync_gap_1" 910 in "Timeline E" 740.

"Timeline F" 750 shows the next step of the system—B Roll 1110 is stopped for a period of (0.8*sync_gap_1−CURRENT_TIME_ACCURACY) seconds 920. (If this value is less than zero, then this step is skipped.) This allows A Roll 1100 to catch up to B Roll, but keep an extra cushion to accommodate potential errors. "Timeline G" 760 represents the restart of B Roll 1130. After B Roll is restarted its QueryCurrentTime function is called and the relative sync with A Roll 1120 is recalculated.

Timelines H, I, J and K 770/780/790/800, respectively, represent an iterative process. As long as B Roll (e.g, 1150) is ahead of A Roll (e.g., 1140) by more than the PAUSE_START_DELAY (920 in 770, 930 in 790) then B Roll is stopped, then immediately (or after a very short pause) restarted, and the new sync time is measured and recalculated. This process is iterated until the gap shrinks to less than PAUSE_START_DELAY seconds.

Ideally this concludes the synchronization process, and A Roll 1200 and B Roll 1210 are synchronized as closely as possible within the CURRENT_TIME_ACCURACY, so in this ideal case both A Roll and B Roll can continue to play until A Roll's QueryCurrentTime value is within CURRENT_TIME_ACCURACY of the CO value as in Timeline L 810. When this occurs the switch is executed that hides A Roll 1220 and reveals B Roll 1230, and the cut transition is thereby effected within an accuracy of CURRENT_TIME_ACCURACY 1480.

In the preferred embodiment, the API volume controls are used to fade the volume of A Roll off, and the volume of B to the value specified in the EDL. In the preferred embodiment, this cross fade happens in four steps over a total of 200 milliseconds. This quick cross fade prevents a potentially distracting "pop" in the composite's audio signal.

Since the actual measurement of the synchronization is subject to various error sources, this synchronization is continually measured until the switch occurs. If A Roll gets ahead of B Roll (e.g. as a result of a buffering fault 600 shown in FIG. 2b) the preferred embodiment may perform another Seek operation 720, and the system will revert to that of Timeline D 730. The preferred embodiment starts the synchronization process early enough 700, so that two seek operations are possible before A Roll hits its CO time 810. On the other hand if B Roll is still ahead of A Roll but it's sync gap becomes greater than PAUSE_RESTART_DELAY seconds, then the Stop/Restart/Calculate process of Timelines I, J, and K 780/790/800 is reiterated as indicated above.

Finally notice that the synchronization of B Roll to A Roll doesn't require that the A Roll has actually begun its "playing" state, only that there is a way to measure and schedule when it will be finished. Therefore the same process can be applied independently to synchronize a C Roll to the B Roll, even before the A Roll to B Roll switch occurs.

Viewer Performance Measuring and Feedback

The wide variety of end user computer systems and browser configurations make it practically impossible to perform thorough testing of a web based program. In the case of the present invention, it is important to know whether the end user is viewing acceptably accurate edits. Therefore the present invention includes the ability to continually measure the relative synchronization of incoming and outgoing edit points, and upload this information to the originating server. This measurement information can be used for introspection, parameter tuning, and diagnostics. In particular this information is used to determine empirical values for the key synchronization parameters: SEEK_START_DELAY, PAUSE_START_DELAY, CURRENT_TIME_ACCURACY, and SEEK_ACCURACY. These empirical values are adjusted accordingly for the end user's computer, browser, and internet connectivity configuration.

The preferred embodiment records the following for each transition from one video segment to another.
1. A unique EDL identifier.
2. An index into the EDL for the A Roll of the transition.
3. An index into the EDL for the B Roll of the transition.
4. The actual "cut out" time for A Roll.
5. The actual "cut in" time for B Roll.
6. The planned amount of time for each Stop/Start operation on the B Roll.
7. The actual amount of time for each Stop/Start operation on the B Roll.
8. The seek start accuracy.
9. The seek start delay.

If available, the originating server will also record an IP address for the client computer, the operating system type of the client computer, and the browser type (more specifically the USER_AGENT header value) of the requesting client. The viewer will also detect whether any of the requested source videos failed to play, and the reason for their failure if available. When the user leaves the web site, all or part of this information is transmitted back to the originating server.

Editing User Interface for Defining and Reviewing the Edit Decision List (Edl) for Multiple Video Transitions The present invention simplifies and optimizes the user workflow of video editing around three basic operations: Selection of the video from internet sources, setting the in and out points of the video, and reviewing and testing the resulting edits.

The preferred embodiment for this invention provides a user interface that is streamlined for a typical casual internet user, rather than a professional video editor. Individual components of the user interface are conventional while their combination for the purpose of editing of streaming internet video sources is novel. As described below such components include a thumbnail list of the playlist videos, controls for ordering of those videos, a coarse control for setting the in and out points, fine tuning controls for adjusting the in and out points, a preview window, and a stop/start button for reviewing the edits. An embodiment may also include controls for setting the volume and controlling stop/start/seek operations on individual videos. However, the preferred embodiment takes advantage of individual video controls as provided by the embedded source video's provider.

The selection of streaming video sources uses publicly available search tools. Most video hosting services provide mechanisms for searching their video databases. These search mechanisms may use keywords, creation dates, user names of their creators, or other heuristics to provide internet links to their video sources. The Google YouTube API is a notable example available at http://code.google.com/apis/youtube/getting_started.html#data_api.

In addition to providing discovery of internet video sources, the preferred embodiment also attempts to determine whether the original video creator's intentions exclude a given video from being used in this application. In particular, metadata that may be accessible using the above search API could indicate that the video may not be embedded in HTML frames in general, or may not be allowed in an editing application. In addition, the preferred embodiment examines its own permissions database to determine whether to allow the video to be used for this purpose. The preferred embodiment database schema is described below.

The preferred embodiment uses internet links to access still images that may be provided along with the original video to visually represent excerpts from that video source. In most cases these are small "thumbnail" still image versions of the videos. In addition, one embodiment uses standard drag-and-drop as well as copy-and-paste user interface conventions to transfer the thumbnail proxies from a search user interface to the active editing user interface. These thumbnail images are arranged in order of the Edit Decision List (EDL) and as such provide the primary representation of the EDL to the user. Similar use of thumbnail image proxies is common among nearly all video editing applications. See e.g., U.S. Pat. No. 5,237,648, issued Aug. 17, 1993.

Selecting a video clip from the EDL exposes the video player associated with that video as described above (in Playback Options for Composite Streaming Video). The video is initially in a "stopped" state. The edit "in" and "out" points for each video clip are indicated visually along a timeline which corresponds to the playback timeline for each video clip. The playback timeline includes an indicator which represents the current playback time (CPT) for the video clip. Note that when the CPT for an individual video clip is between the specified "in" and "out" points, this indicator also represents the EDL's current playback time (ECPT). ECPT is easily obtained as:

$$ECPT = Video\_1\_Out - Video\_1\_In + Video\_2\_Out - Video\_2\_In + \ldots + Video\_m\_CPT - Video\_m\_In$$

where "m" represents the EDL index of the current video. The preferred embodiment employs mechanisms setting "in" and "out" points with separate controls for gross adjustment and fine adjustment. It also provides controls for marking these times with button clicks while a target video clip is playing. Such functions are also common among nearly all video editing applications. Final Cut Pro from Apple Corporation is a well known full featured example.

Conventional video editing tools present users with frame accurate editing capabilities. To do so they usually have a user interface that displays individual frames and some representation of the exact frame at which a transition is to take place. As mentioned above browser based frame accurate editing of streaming video is challenging if not impossible, and still images for individual frames are generally not accessible for streaming video. Therefore the preferred embodiment excludes display of video still frames. Instead the preferred embodiment simplifies the edit review process to a single click of the "test playback button". The "test playback button" subtracts 10 seconds from the ECPT and starts the playback of the edited video sequence from that position. Since a user would typically stop the exposed video near a recently set "in" or "out" point, this 10 second pre-roll would generally provide the user with a preview of their most recent edit. In addition to providing the user with a visual preview of the edit, the preferred embodiment provides the user with a numerical indication of the accuracy of the edit playback execution. While the employment of pre-roll for video edit review has been used before (e.g., U.S. Pat. No. 4,538,188, issued Aug. 27, 1995), the use of pre-roll for reviewing streaming video editing is not otherwise known.

The preferred embodiment allows for the inclusion of still images and text cards whose playback is simply displaying the held image for a fixed duration.

Alternative embodiments may include typical transitions such as "wipes", "fades", "dissolves", or more complex transitions. Additional alternative embodiments may allow for separate "in" and "out" points for audio and video components of each video, or entirely separate sources of audio and video components. However, the preferred embodiment of this invention excludes such functionality to simplify the user interface, and to protect the rights and intentions of the original video creators.

The preferred embodiment allows for embedding both the playback and editing functions in third party web pages. This is enabled by HTML iframes. Most web based video players allow for similar embedding in third party web sites.

EDL Upload and Sharing

When a user is satisfied with their EDL, they may save it to the EDL Server 110 as shown in FIG. 1. This may be done using standard Hyper Text Transfer Protocol (HTTP) "post" requests.

The preferred embodiment includes a database table for each of the following
1. EDL records;
2. User records;
3. Video Reference records (internet links to internet accessible videos); and
4. Diagnostic records.

The database 100 may employ any of the publicly available database engines including MySQL, SQLite, PostGreSQL, etc. In addition to providing metadata for each of tables' records, the database also employs the following inter-table relationships:
1. Single User—Many EDL's;
2. Single Diagnostic—Many EDL's; and
3. Many Video References—Many EDL's.

The EDL server 110 is capable of generating HTTP responses which package everything that an embedding web page may need to play or edit the EDL on a standards compliant browser 180. This packaging includes HTML files, JavaScript files, and CSS files. The Web Site Server 110 may be constructed from standard tools such as Django (https://www.djangoproject.com/) and Apache HTTP Server (http://projects.apache.org/projects/http_server.html). In addition to allowing embedding of the player via HTML iframes, the preferred embodiment also allows for transmitting of web links which link to a player/editor web site. The transmitting of the web links can be done through established means including electronic mail, social media posting, or instance messaging service.

In still other alternative embodiments, various features of the above-described embodiments could be combined to provide other options and/or features to the internet streaming video viewer.

Those of skill in the art will appreciate that the various illustrative modules, engines, and method steps described in connection with the above described figures and the embodiments disclosed herein can often be implemented as electronic hardware, software, firmware, or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Suitable computers for use in implementing the present invention may be obtained from various places. Various computers, however, may be used depending upon the size and complexity of the tasks. Suitable computers include mainframe computers, multiprocessor computers, workstations, personal computers, laptops, tablets, cell phones, or other network connected mobile devices. In addition, although a general purpose computer system has been described above, a special-purpose computer may also be used.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the method claims, the order of presentation of the elements does not indicate a particular order for performing the method.

I claim:

1. A method for accurately transitioning among a plurality of streaming internet videos from one or more sources in a standards compliant browser, the method comprising:
    storing, at a server computer, a plurality of edit decision list (EDL);
    accepting a request to specify a particular one of the plurality of EDL;
    providing, from the server computer, to the browser on an internet connected computer the particular EDL and instructions to frame at least one video playback window and an associated user interface; and
    establishing, using the server computer, connections to the one or more sources of the streaming internet videos as specified by the particular EDL,
    wherein the server computer controls the associated user interface based on the particular EDL to
        facilitate download of a first video from a first source to a first video playback window visible to a user in the browser;
        facilitate download of a second video from a second source to a hidden second video playback window;
        determine an out point of the first video from the particular EDL;
        determine an in point of the second video from the particular EDL;
        pause the second video in the second video playback window a predetermined time before the in point of the second video;
        hide the first video playback window and show the second playback window in place of the first video playback window when the first video reaches the out point of the first video; and
        unpause the second video in the second video playback window.

2. The method of claim 1, wherein the accepting a request is via a Uniform Resource Locator (URL).

3. The method of claim 1, wherein each of the plurality of EDL further comprises:
    an identifier for each video source;
    in and out points for each video source; and
    an audio volume value for each identifier.

4. The method of claim 1, further comprising:
    providing, from the server computer, a program for manipulating the EDL.

5. The method of claim 4, wherein the program for manipulating the EDL allows for modification of existing EDL and creation of new EDL.

6. The method of claim 4, wherein the program for manipulating the EDL is written in JavaScript®.

7. The method of claim 1, wherein the providing instructions comprises providing hypertext markup language (HTML) instructions.

8. The method of claim 1, wherein the one or more sources are not located on the same computer network.

9. A method for accurately transitioning among a plurality of streaming internet videos from one or more sources in a standards compliant browser, the method comprising:
    storing, at a server computer, a plurality of edit decision list (EDL);
    accepting a request to specify a particular EDL one of the plurality of EDL;
    providing, from the server computer, to the browser on an internet connected computer the particular EDL and instructions to frame at least one video playback window and an associated user interface; and
    establishing, using the server computer, connections to the one or more sources of the streaming internet videos as specified by the particular EDL,
    wherein the server computer controls the associated user interface based on the particular EDL to
        facilitate download of a first video from a first source to a first video playback window visible to a user in the browser;
        facilitate download of a second video from a second source to a hidden second video playback window;
        determine an out point of the first video from the particular EDL;

determine an in point of the second video from the particular EDL;

synchronize the second video in the second video playback window with the first video the first video playback window such that the second video is playing at the in point of the second video when the first video reaches the out point of the first video; and display the second playback window in place of the first video playback window when the first and second videos reach the now synchronized out point/in point.

10. The method of claim 9, wherein the accepting a request is via a Uniform Resource Locator (URL).

11. The method of claim 9, wherein each of the plurality of EDL further comprises:

an identifier for each video source;

in and out points for each video source; and an audio volume value for each identifier.

12. The method of claim 9, further comprising:

providing, from the server computer, a program for manipulating the EDL.

13. The method of claim 12, wherein the program for manipulating the EDL allows for modification of existing EDL and creation of new EDL.

14. The method of claim 12, wherein the program for manipulating the EDL is written in JavaScript®.

15. The method of claim 9, wherein the providing instructions comprises providing hypertext markup language (HTML) instructions.

16. The method of claim 9, wherein the one or more sources are not located on the same computer network.

* * * * *